(12) United States Patent
Lee et al.

(10) Patent No.: US 10,601,081 B2
(45) Date of Patent: Mar. 24, 2020

(54) BATTERY PACK

(71) Applicant: Samsung SDI Co., Ltd., Yongin-si, Gyeonggi-do (KR)

(72) Inventors: Sangjoo Lee, Yongin-si (KR); Hyungshin Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 632 days.

(21) Appl. No.: 15/245,033

(22) Filed: Aug. 23, 2016

(65) Prior Publication Data

US 2017/0062794 A1 Mar. 2, 2017

(30) Foreign Application Priority Data

Aug. 28, 2015 (KR) .......................... 10-2015-012741

(51) Int. Cl.
*H01M 10/42* (2006.01)
*H01M 2/02* (2006.01)
*H01M 2/34* (2006.01)
*H01M 2/30* (2006.01)

(52) U.S. Cl.
CPC ........... *H01M 10/425* (2013.01); *H01M 2/30* (2013.01); *H01M 2/021* (2013.01); *H01M 2/0212* (2013.01); *H01M 2/0287* (2013.01); *H01M 2200/00* (2013.01); *H01M 2220/30* (2013.01)

(58) Field of Classification Search
None
See application file for complete search history.

(56) References Cited

U.S. PATENT DOCUMENTS

| 2010/0066307 | A1 | 3/2010 | Kim | |
| 2010/0203374 | A1* | 8/2010 | Kano | H01M 2/1061 429/100 |
| 2011/0039129 | A1* | 2/2011 | Lee | H01M 2/0404 429/7 |
| 2011/0086242 | A1* | 4/2011 | Lee | H01M 2/021 429/7 |
| 2011/0250475 | A1* | 10/2011 | Yamamoto | H01M 2/0277 429/7 |
| 2012/0270074 | A1* | 10/2012 | Koh | H01M 2/0212 429/7 |

(Continued)

FOREIGN PATENT DOCUMENTS

| JP | 2007234550 A | 9/2007 |
| JP | 2013080570 A | 5/2013 |

(Continued)

*Primary Examiner* — Haroon S. Sheikh
(74) *Attorney, Agent, or Firm* — Knobbe Martens Olson & Bear LLP

(57) ABSTRACT

Provided is a battery pack, which can provide a space for mounting an external element or an external device by forming a stepped portion in a protection circuit module (PCM). The battery pack includes a bare cell having a positive lead tab and a negative lead tab, a protection circuit module (PCM) electrically connected to the positive lead tab and the negative lead tab and having a stepped portion recessed from one side to the other side and having a smaller height than a peripheral portion, and a first insulating member having a groove formed to correspond to the stepped portion and surround at least a portion of the bare cell and the PCM.

21 Claims, 16 Drawing Sheets

(56) References Cited

U.S. PATENT DOCUMENTS

2013/0059171 A1* 3/2013 Kim .................... H01M 2/0404
429/7
2013/0149561 A1* 6/2013 Hong .................. H01M 2/0469
429/7

FOREIGN PATENT DOCUMENTS

KR 20120011558 A 2/2012
KR 20150009877 A 1/2015

* cited by examiner

BATTERY PACK

RELATED APPLICATIONS

This application claims priority to and the benefit of Korean Patent Application No. 10-2015-0121741 filed on Aug. 28, 2015 in the Korean Intellectual Property Office, and all the benefits accruing therefrom under 35 U.S.C. 119, the contents of which in its entirety are herein incorporated by reference.

BACKGROUND

Field

The present invention relates to a battery pack.

Description of the Related Art

Unlike a primary battery, a rechargeable battery used in a battery pack can be repeatedly charged and discharged. A small-capacity rechargeable battery using a single battery cell packaged in the form of a pack is used for driving a small electronic device, such as mobile phones, camcorders, and the like, while a large-capacity rechargeable battery using tens of battery cells connected to each other in a battery pack may be used as power sources for driving motors such as in hybrid electric vehicles (HEV).

As compact and lightweight portable electronic or electrical appliances such as cellular phones, notebook computers and camcorders are actively developed and produced, these portable electronic or electrical appliances are typically accompanied by a battery pack intended to provide electrical power to the appliance in any place even without a separate power supply.

SUMMARY OF CERTAIN INVENTIVE ASPECTS

Embodiments of the present invention provide a battery pack, which can provide a space for mounting an external element or an external device by forming a stepped portion in a protection circuit module (PCM).

Embodiments of the present invention provide a battery pack, which includes a groove corresponding to a stepped portion and an insulating member surrounding a protection circuit module (PCM) and a bare cell.

The above and other aspects of the present invention will be described in or be apparent from the following description of exemplary embodiments.

According to an aspect of the present invention, there is provided a battery pack including a bare cell having a positive lead tab and a negative lead tab, a protection circuit module (PCM) electrically connected to the positive lead tab and the negative lead tab and having a stepped portion and a peripheral portion wherein the step portion is recessed from one side to the other side and having a smaller height than the peripheral portion, and a first insulating member having a groove formed to correspond to the stepped portion and surround at least a portion of the bare cell and the PCM.

The PCM may include a protection circuit board connected to the positive lead tab and the negative lead tab and having long sides and short sides, at least one protection circuit device mounted on the protection circuit board, and a connector outwardly extending from the protection circuit board, wherein the stepped portion is formed on the long side of the protection circuit board.

A terrace portion may be formed at an end of the bare cell and may surround portions of the positive lead tab and the negative lead tab, and the protection circuit board may be mounted on the terrace portion.

The first insulating member may include a first region covering a front surface of the protection circuit board, a second region bent from the end of the first region and extending to one side and covering a rear surface of the protection circuit board, and a third region bent from the end of the second region and extending to the other side and covering the terrace portion, wherein the second region and the third region are sequentially disposed between the protection circuit board and the terrace portion.

A first groove corresponding to the stepped portion may be formed through the second region and the third region of the first insulating member.

The second region of the first insulating member may include at least one protrusion extending from the first groove, and the protrusion may be bent on the stepped portion to cover the front surface of the PCM.

A second groove corresponding to the stepped portion may be formed at one side of the first region of the first insulating member.

The battery pack may further include a second insulating member surrounds the rear surface of the bare cell and the first region of the first insulating member on the protection circuit board.

The second insulating member may include a body portion covering the front surface of the bare cell, a first extending portion extending from the body portion to the stepped portion and bent to the other side to cover the first region of the first insulating member, a second extending portion extending from the body portion to the peripheral portion and bent to the other side to cover the first region of the first insulating member, a third extending portion extending from the body portion to the right side and bent to cover the first region of the first insulating member, and a fourth extending portion extending from the body portion to the left side and bent to cover the first region of the first insulating member.

The first region of the first insulating member may further include an extending portion bent to cover the rear surface of the bare cell.

The extending portion may include a first extending portion bent from the stepped portion to the other side, a second extending portion bent from the peripheral portion to the other side, a third extending portion bent from the right side, and a fourth extending portion bent from the left side.

The stepped portion may be formed to be adjacent to the short side of the protection circuit board.

The stepped portion may be formed at a central region of the long side portion of the protection circuit board.

The first insulating member may include cutting lines formed at bending lines of the second region and the third region, and the cutting lines may be formed to extend from the first groove to the left short side or the right short side.

As described above, the battery pack according to an embodiment of the present invention can provide a space for mounting an external element or an external device by forming a stepped portion in a protection circuit module (PCM).

In addition, in the battery pack according to an embodiment of the present invention, a groove corresponding to a stepped portion is formed and an insulating member surrounding a protection circuit module (PCM) and a bare cell is provided.

BRIEF DESCRIPTION OF THE DRAWINGS

The above and other features of the present invention will become more apparent by describing in detail exemplary embodiments thereof with reference to the attached drawings in which.

DETAILED DESCRIPTION OF CERTAIN INVENTIVE EMBODIMENTS

Hereinafter, examples of embodiments of the invention will be described in detail with reference to the accompanying drawings such that they can easily be made and used by those skilled in the art.

The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

As used herein, the term "and/or" includes any and all combinations of one or more of the associated listed items. Like numbers refer to like elements throughout. The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc. may be used herein to describe various elements, these elements should not be limited by these terms. These terms are only used to distinguish one element from another.

Hereinafter, a battery pack according to an embodiment of the present invention and a manufacturing method thereof will be described with reference to FIGS. 1 to 15.

Figure 1:
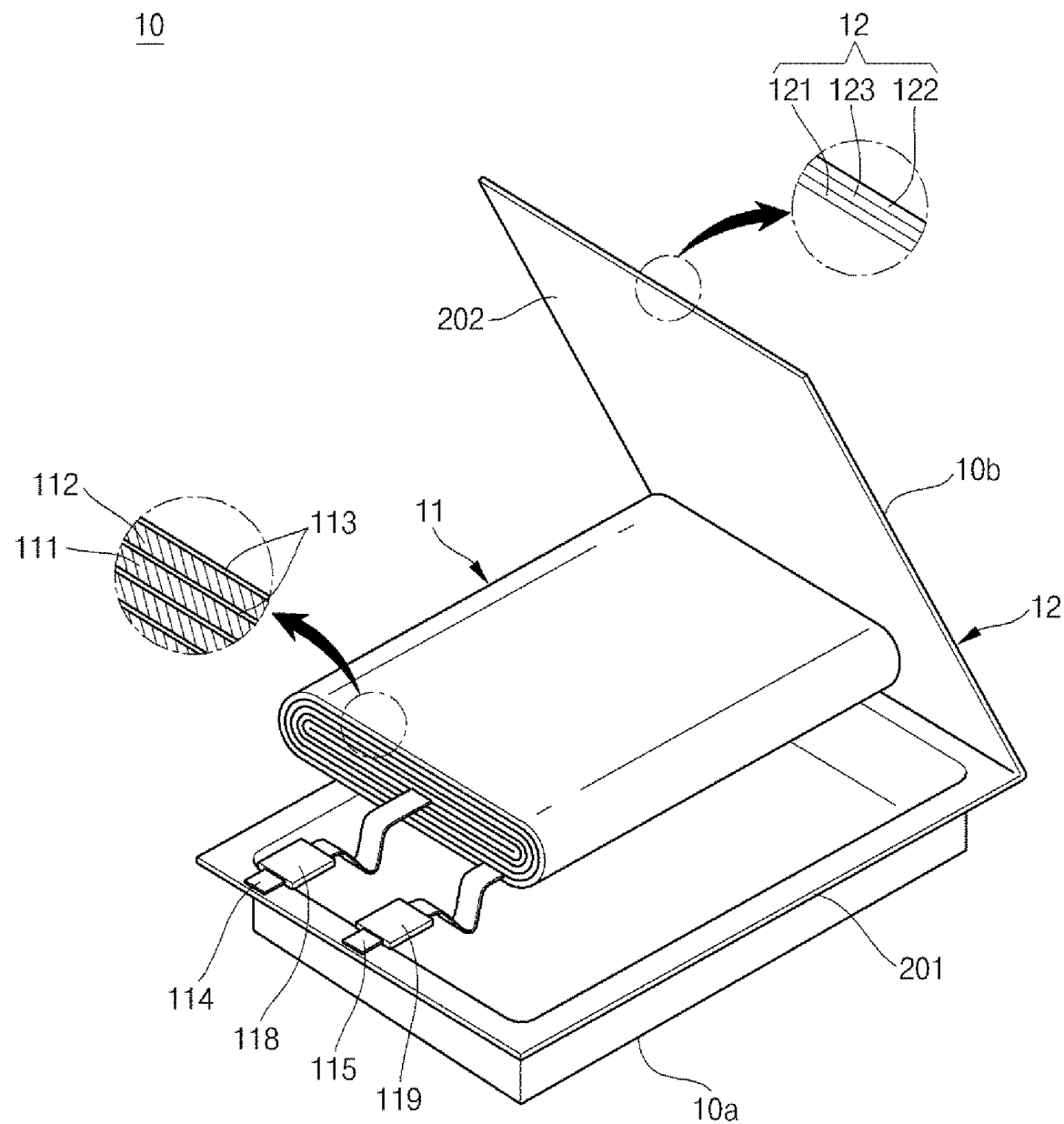
FIG. 1 is an exploded perspective view of a battery pack according to an embodiment of the present invention.
Figure 2:
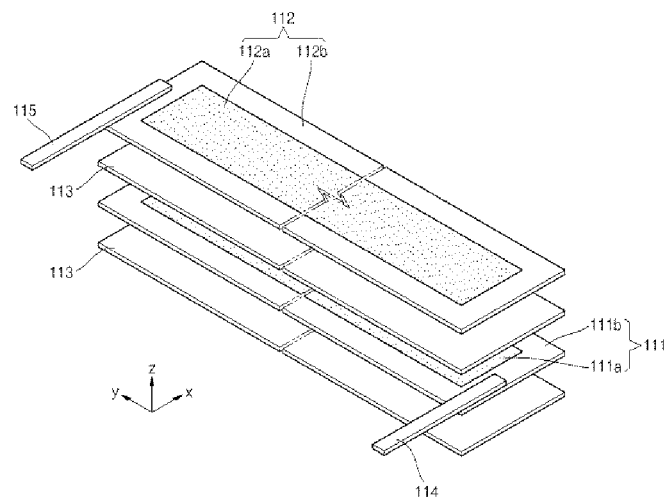
FIG. 2 is an exploded perspective view of an electrode assembly of FIG. 1.

FIG. 1 is an exploded perspective view of a battery pack according to an embodiment of the present invention, FIG. 2 is an exploded perspective view of an electrode assembly of FIG. 1, and FIGS. 3 to 15 are partially cross-sectional views sequentially illustrating a manufacturing method of a battery pack according to an embodiment of the present invention.

First, referring to FIGS. 1 and 2, in the battery pack according to an embodiment of the present invention, a battery cell 10 includes an electrode assembly 11 performing charging and discharging operations and a pouch 12 housing the electrode assembly 11.

The electrode assembly 11 is formed in a jelly-roll configuration by arranging a first electrode (to be referred to as a 'positive electrode' hereinafter) 111 and a second electrode (to be referred to as a 'negative electrode' for convenience sake) 112 with a separator 113 disposed between the first electrode 111 and the second electrode 112). The separator 113 may be formed of a polymer film allowing lithium ions to move.

The positive electrode 111 may include a positive electrode active material layer 111a having a positive electrode active material coated on a positive electrode current collector formed of a highly conductive metal thin plate, e.g., an aluminum (Al) foil, and an uncoated portion 111b that is an exposed current collector without a positive electrode active material coated thereon. A first lead tab (to be referred to as a 'positive lead tab' hereinafter) is connected to the uncoated portion 111b of the positive electrode 114.

Here, a chalcogenide compound is used as an active material of the positive electrode active material layer 111a, and examples of the active material may include, but not limited to, composite metal oxides, such as $LiCoO_2$, $LiMn_2O_4$, $LiNiO_2$, $LiNi_{1-x}Co_xO_2$ ($0<x<1$), or $LiMnO_2$.

The negative electrode 112 may include a negative electrode active material layer 112a coated on a negative electrode current collector formed of a conductive metal thin plate, for example, a copper (Cu) or nickel (Ni) foil, different from the positive electrode active material. A second lead tab (to be referred to as a 'negative lead tab' hereinafter) is connected to the uncoated portion 112b of the negative electrode 112 from the opposite side of the first lead tab 114.

Examples of the active material of the negative electrode active material layer 112a may include, but not limited to, carbon (C) based materials, Si, Sn, tin oxide, composite tin alloys, transition metal oxides, lithium metal nitrides or lithium metal oxides.

The electrode assembly 11 is accommodated in the pouch 12 with an electrolyte.

The pouch 12 may be formed of multi-layered sheets surrounding exterior portions of the electrode assembly 11. For example, the pouch 12 includes a polymer sheet 121 forming an inner surface of the pouch 12 and functioning for insulation and thermal fusion, a polyethyleneterephthalate (PET) sheet, a nylon sheet or a PET-nylon composite sheet (for brevity, to be referred to as a "nylon sheet" hereinafter) 122 forming an outer surface of the pouch 12 to protect the pouch 12, and a metal sheet 123 providing mechanical strength to the pouch 12. The metal sheet 123 is interposed between the polymer sheet 121 and the nylon sheet 122 and may be formed of, for example, an aluminum (Al) sheet.

In addition, the pouch 12 includes a first outer case member 201 accommodating the electrode assembly 11, and a second outer case member 202 covering the electrode assembly 11 and thermally fused to the first outer case member 201 at the outside of the electrode assembly 11. Each of the first and second outer case members 201 and 202 may include the polymer sheet 121, the nylon sheet 122 and the metal sheet 123 having the same configuration.

For example, the first outer case member 201 is formed to have a concave structure to accommodate the electrode assembly 11, and the second outer case member 202 is flatly formed to cover the electrode assembly 11 accommodated in the first outer case member 201.

In addition, the electrode assembly 11 is formed in a flat panel structure of a rectangular parallelepiped. Accordingly, the pouch 12 is also formed in a flat panel structure of a rectangular parallelepiped. Since the bare cell 10 is formed by surrounding the electrode assembly 11 with the pouch 12, the overall configuration of the bare cell 10 may have a flat panel structure of a rectangular parallelepiped.

For convenience sake, an outer surface of the first outer case member 201 is defined as a front surface 10a of the bare cell 10 and an outer surface of the second outer case member 202 is defined as a rear surface 10b of the bare cell 10.

In addition, the terrace portion may be formed at one-side end of edges of the first outer case member 201 and the second outer case member 202, where the first outer case member 201 and the second outer case member 202 are thermally fused.

The electrode assembly 11 may further include a positive lead tab 114 connected to the uncoated portion of the positive electrode 111 and a negative lead tab 115 connected to the uncoated portion of the negative electrode 112. For example, the positive lead tab 114 and the negative lead tab 115 are connected to the same side surface of the electrode assembly 11 to then be drawn out to the same side surface of the pouch 12.

The positive lead tab 114 and the negative lead tab 115 are disposed to pass through a portion between the first outer case member 201 and the second outer case member 202 thermally fused at the terrace portion formed at one side of the pouch 12. That is to say, the terrace portion is formed to cover portions of the positive lead tab 114 and the negative lead tab 115.

Here, the positive lead tab 114 and the negative lead tab 115 are electrically insulated from the pouch 12 by insulating members 118 and 119.

Figure 3:
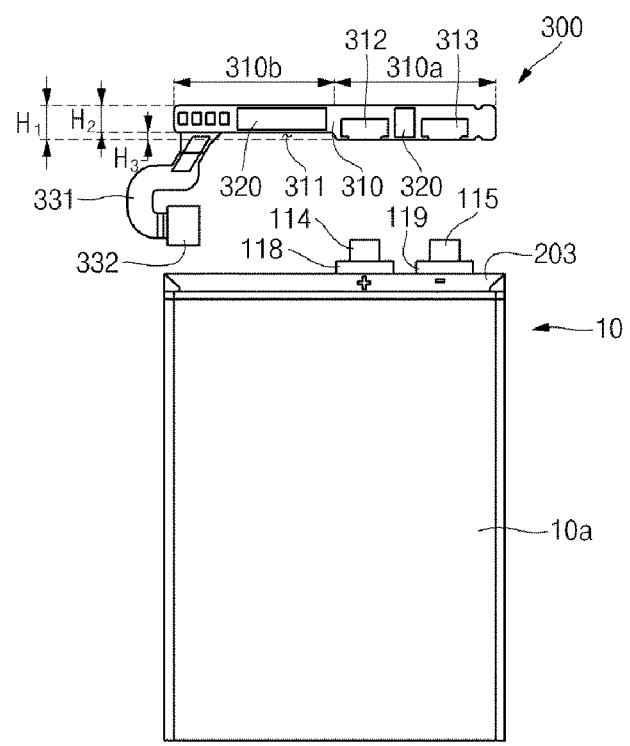
FIGS. 3 to 15 are partially cross-sectional views sequentially illustrating a manufacturing method of a battery pack according to an embodiment of the present invention.
Figure 4:
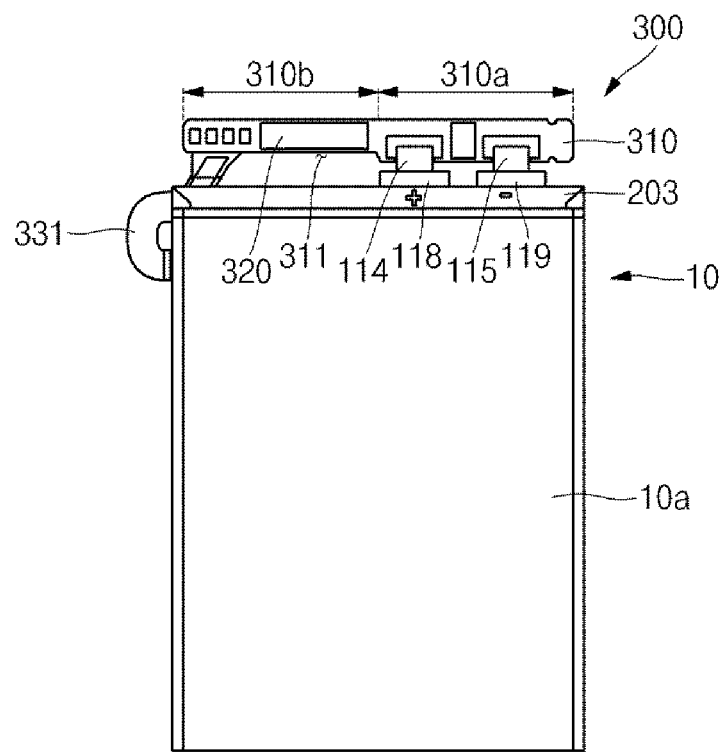

Referring to FIGS. 3 and 4, the PCM 300 is disposed to an upper end of the bare cell 10 to be electrically connected to the positive lead tab 114 and the negative lead tab 115.

The PCM 300 is electrically connected to the bare cell 10 and controls charge/discharge of the bare cell 10. The PCM 300 includes a protection circuit board 310, a protection circuit device 320 and a connector 332.

The protection circuit board 310 may include a circuit (not shown) controlling charge/discharge of the bare cell 10, or a protection circuit (not shown) preventing over-discharge/over-discharge.

The protection circuit board 310 may be made of an insulating material and has a structure of a substantially rectangular parallelepiped. Since the protection circuit board 310 has an insulating property, a process of insulating the protection circuit board 310 from the bare cell 10 may not be required. In addition, the protection circuit board 310 may be shaped to extend in one direction so as to correspond to the shape of a terrace portion 203.

The protection circuit board 310 has a peripheral portion 310a having a first height H1 and a recessed portion 310b having a second height H2, which is recessed by a third height H3 from the first height H1. In other words, the protection circuit board 310 has a stepped portion 311 that is recessed by the third height H3 relative to the peripheral portion 310a.

In addition, the protection circuit board 310 includes a positive electrode terminal 312 and a negative electrode terminal 313 formed on its one surface (which is to turn into a rear surface later when the protection circuit board 310 is overturned), to which the positive lead tab 114 and the negative lead tab 115 are connected.

The positive electrode terminal 312 is formed in a substantially flat rectangular panel structure and is connected to the positive lead tab 114. In addition, the negative electrode terminal 313 is also formed in a substantially flat rectangular panel structure and is connected to the negative lead tab 115. In detail, the positive lead tab 114 and the negative lead tab 115 are electrically connected to the positive electrode terminal 312 and the negative electrode terminal 313 by welding, respectively.

The protection circuit device 320 may be mounted on one surface or both surfaces of the protection circuit board 310 and may include a plurality of passive and active elements to then be electrically connected to a conductive metal. The protection circuit device 320 checks information on the charged or discharged state of battery or the current, voltage or temperature of battery, and so on, to protect the battery.

The connector 332 may outwardly extend from the protection circuit board 310 through a connector 331 and may be connected to an external device.

In the present invention, the connector 331 having a shape of a wire is illustrated, but aspects of the present invention are not limited thereto. The connector 331 may also be formed to have various shapes, including a plate, for example.

Figure 5:
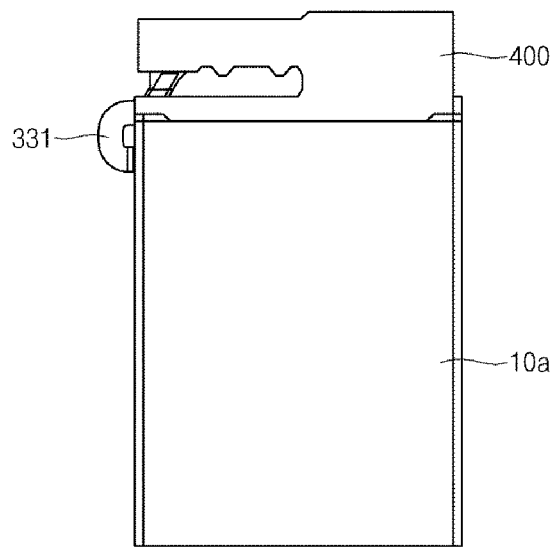
Figure 6:
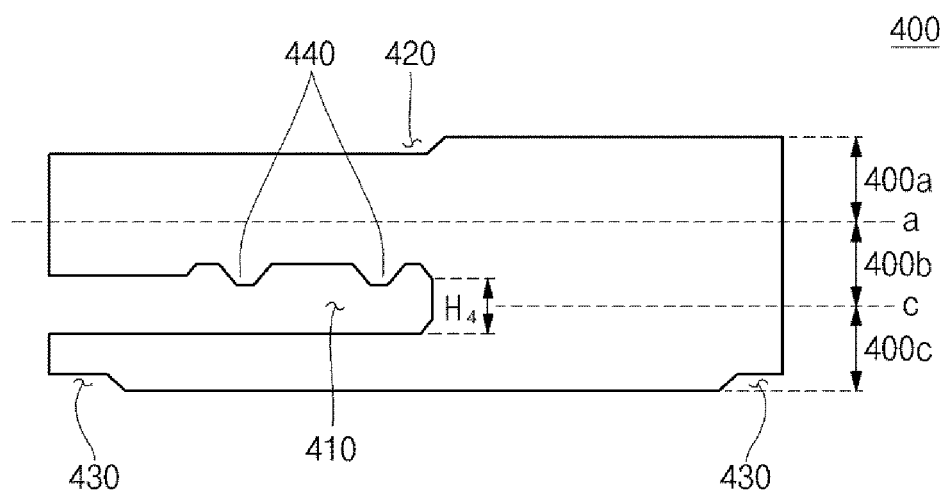

Referring to FIGS. 5 and 6, a first insulating member 400 is disposed on connecting portions of the bare cell 10 and the PCM 300.

The first insulating member 400 is preferably formed of an insulating tape having an adhesive material coated on surfaces corresponding to the bare cell 10 and the PCM 300 for the purpose of facilitating the process.

The first insulating member 400 includes a first region 400a, a second region 400b and a third region 400c.

First, the second region 400b is attached to cover one surface of the protection circuit board 310 and has a first bending line a formed on its top surface and a third bending line c formed on its bottom surface.

The third region 400c is formed under the third bending line c of the second region 400b and is attached to cover the terrace portion 203.

A first groove 410 located to correspond to the stepped portion 311 is formed at a boundary portion between the second region 400b and the third region 400c. Since the first groove 410 is bent about the third bending line c, it has a height H4, which is approximately two times larger than the height H3 of the stepped portion 311, to make its shape after being bent correspond to the shape of the stepped portion 311.

In addition, the second region 400b includes at least one protrusion 440 extending from the first groove 410 to the third region 400c. The at least one protrusion 440 is bent in a first direction in view of the second bending line b on the stepped portion 311 and is attached to cover the other surface of the protection circuit board 310 (which is to turn into a front surface later when the protection circuit board 310 is overturned).

The first region 400a is a region formed on the first bending line a of the second region 400b and has a second groove 420 shaped and located to correspond to the stepped portion 311.

In order to minimize interference between the third region 400c and a side surface bending line of the pouch 10 formed on the terrace portion 203, a third groove 430 is preferably formed opposite corners of a bottom side of the third region 400c.

Figure 7:
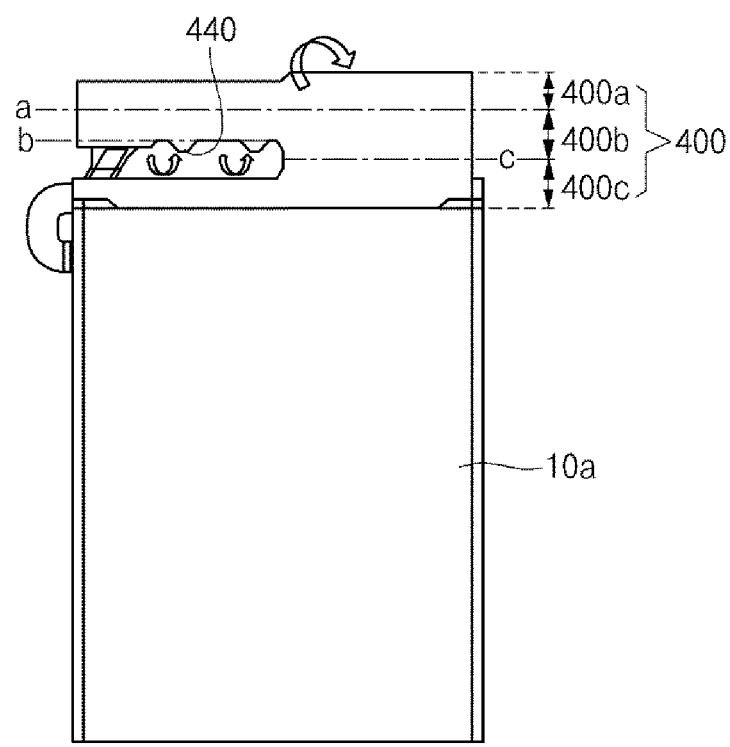
Figure 8:
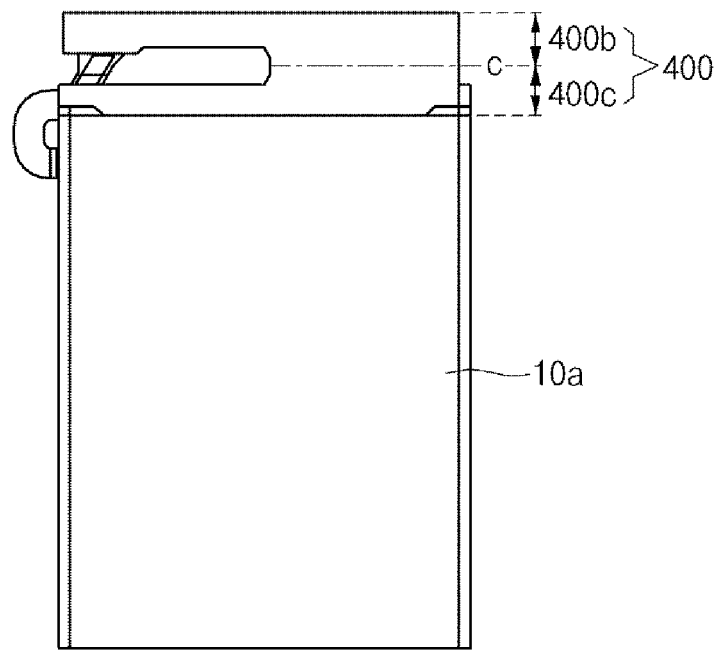

Next, referring to FIGS. 7 and 8, the first region 400a of the first insulating member 400 is bent in a second direction opposite to the first direction in view of the first bending line a and is attached to cover the other surface of the protection circuit board 310

Figure 9:
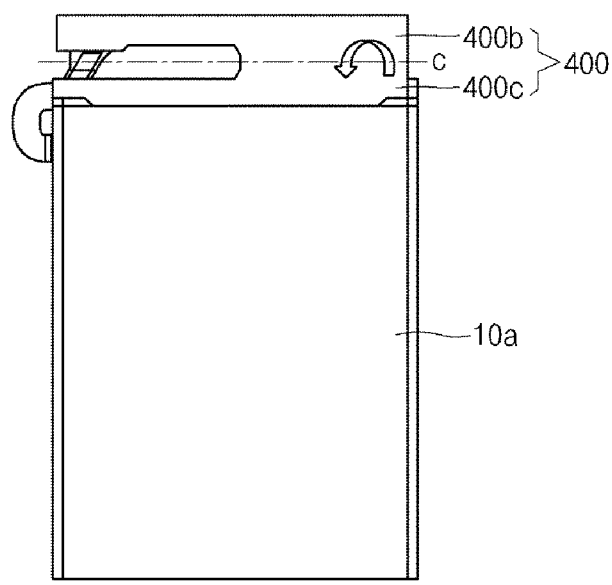
Figure 10:
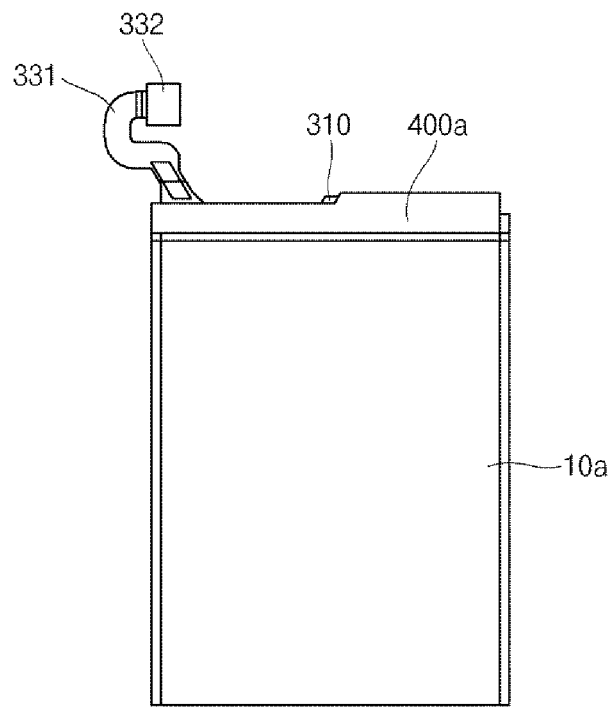

Next, referring to FIGS. 9 and 10, the second region 400b of the first insulating member 400 is bent in the first direction in view of the third bending line c to then be disposed on the third region 400c. Accordingly, the second region 400b and the third region 400c are sequentially interposed between the protection circuit board 310 and the terrace portion 203.

At this stage, the PCM 300 is also overturned, so that top and bottom portions of the PCM 300 are inverted.

Figure 11:
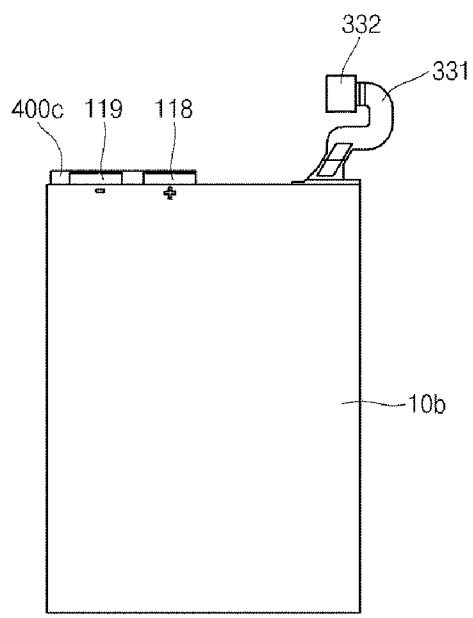
Figure 12:
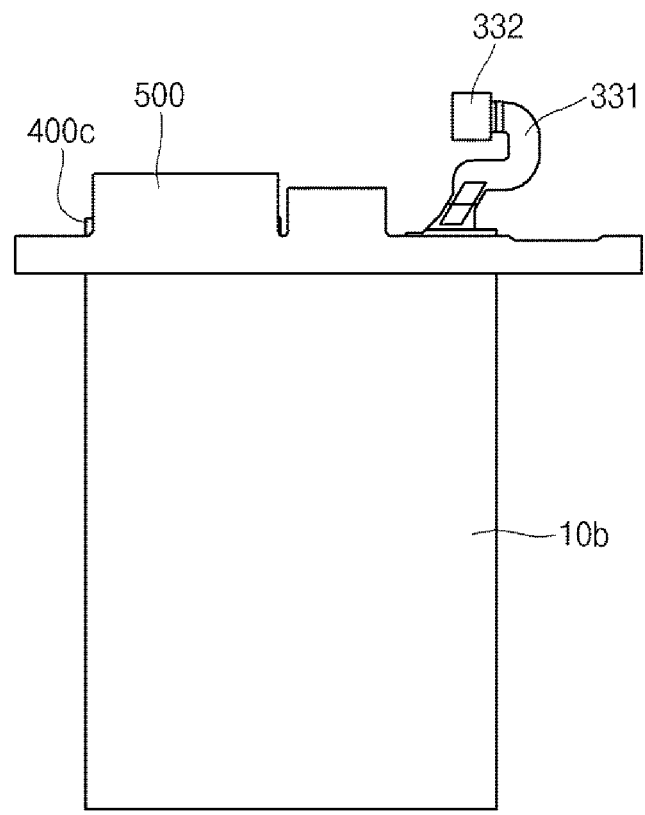
Figure 13:
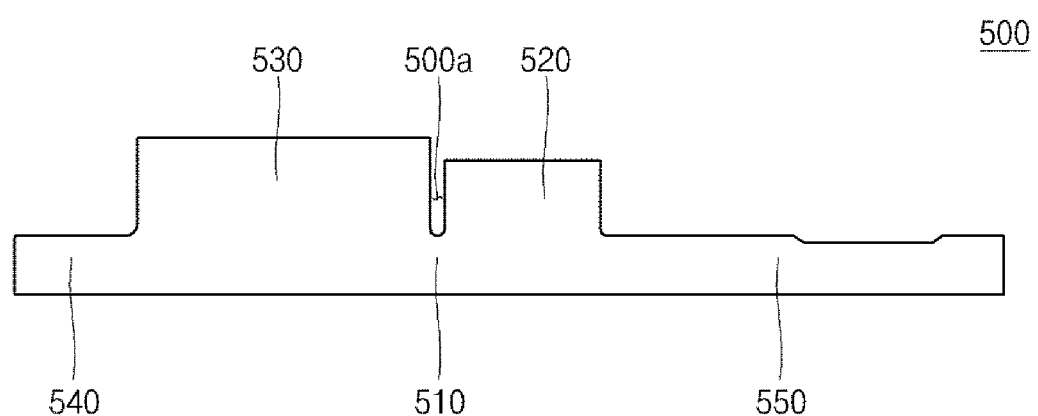
Figure 14:
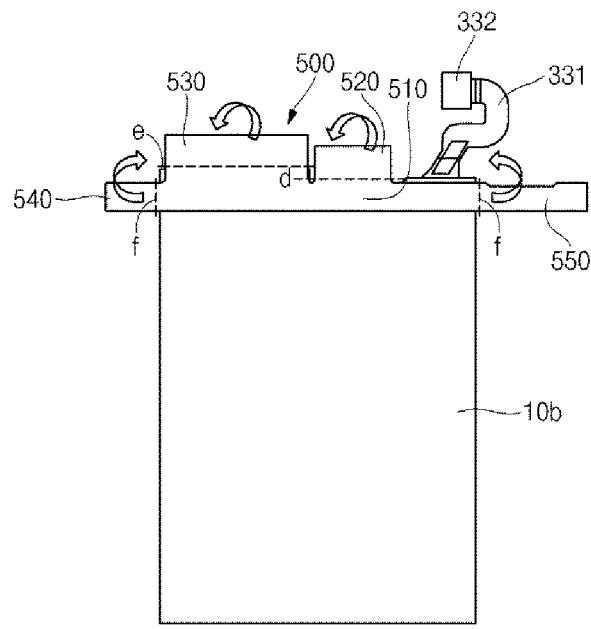
Figure 15:
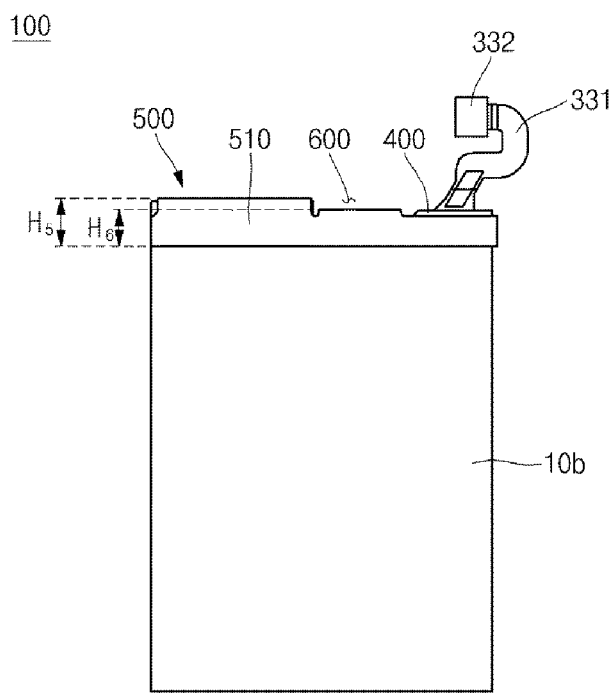

Referring to FIGS. 11 and 15, a second insulating member 500 is disposed on the rear surface 10b of the bare cell 10.

Here, the second insulating member 500 is preferably formed of an insulating tape having an adhesive material coated on a surface corresponding to the rear surface 10b of the bare cell 10 for the purpose of facilitating the process.

The second insulating member 500 includes a body portion 510 and a plurality of extending portions 520, 530, 540 and 550 extending from the body portion 510.

The body portion 510 is attached to cover the rear surface 10b of the bare cell 10 and includes a fourth bending line d and a fifth bending line e formed on its top surface and a sixth bending line f formed on its left and right sides.

The extending portions 520, 530, 540 and 550 include a first extending portion 520, a second extending portion 530, a third extending portion 540 and a fourth extending portion 550.

The first extending portion 520 is formed at a location corresponding to the stepped portion 311 and is downwardly bent from the fourth bending line d first region 400a of the first insulating member 400.

The second extending portion 530 is formed at a location corresponding to the peripheral portion 310a and is downwardly bent from the fifth bending line e to cover the first region 400a of the first insulating member 400.

A separating groove 500a is formed between the first extending portion 520 and the second extending portion 530 to separate the first extending portion 520 and the second extending portion 530 from each other.

The third extending portion 540 and the fourth extending portion 550 extend from the body portion 510 in left and right sides and are bent from the sixth bending line f in left and right sides, respectively, to cover the first region 400a of the first insulating member 400 on the terrace portion 203.

In the illustrated embodiment, the first bending line a to the sixth bending line f are single lines, which is, however, only for convenience sake of explanation. In view of mechanism of connection with other components, each of the first to sixth bending lines a to f may be formed to have a predetermined width.

That is to say, the PCM 300 surrounded by the first insulating member 400 and the second insulating member 500 has a fifth height H5 at its region corresponding to the peripheral portion 310a and a sixth height H6 at its region corresponding to the recessed portion 310b.

That is to say, the completed battery pack 100 has a stepped portion 600 having the sixth height H6, thereby providing a space for mounting an external element or an external device.

Next, a battery pack according to another embodiment of the present invention and a manufacturing method thereof will be described with reference to FIGS. 16 to 23.

FIGS. 16 to 23 are partially cross-sectional views sequentially illustrating a manufacturing method of a battery pack according to another embodiment of the present invention.

Figure 16:
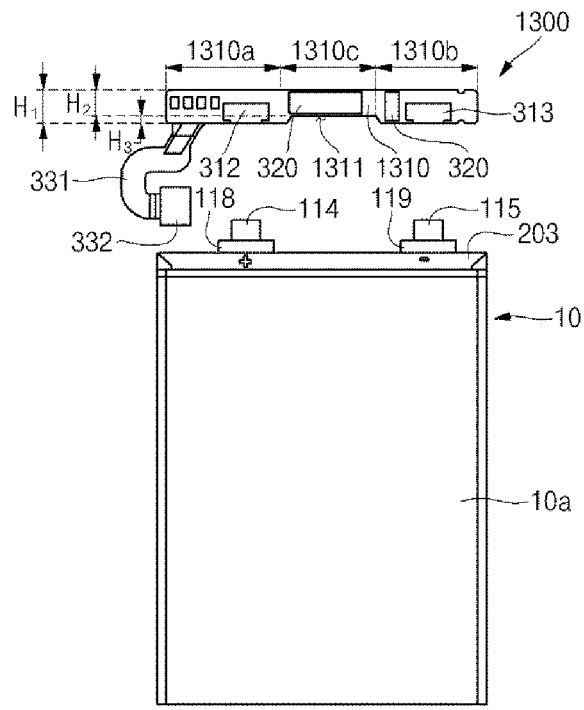
FIGS. 16 to 23 are partially cross-sectional views sequentially illustrating a manufacturing method of a battery pack according to another embodiment of the present invention.
Figure 17:
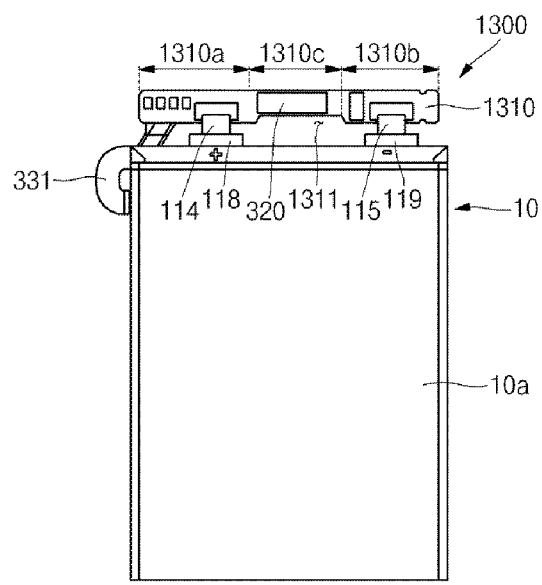

Referring to FIGS. 16 and 17, a protective circuit module (PCM) 1300 is disposed to be electrically connected to a positive lead tab 114 and a negative lead tab 115 protruding to a top end of a bare cell 10.

In FIG. 16, the same functional components as those shown in FIG. 3 will be denoted by the same reference numerals, and detailed descriptions thereof will be omitted.

The PCM 1300 is electrically connected to the bare cell 10 and controls charge/discharge of the bare cell 10. The PCM 1300 includes a protection circuit board 1310, a protection circuit device 320 and a connector 332.

The protection circuit board 1310 has peripheral portions 1310a and 1301b having a first height H1 and a recessed portion 1310c having a second height H2, which is recessed by a third height H3 from the first height H1. In other words, the protection circuit board 1310 has a stepped portion 1311 that is recessed by the third height H3.

In the battery pack according to another embodiment of the present invention, the recessed portion 1310c is formed at a roughly central region of the protection circuit board 1310. That is to say, the first peripheral portion 1310a and the second peripheral portion 1310b are formed at opposite ends of the protection circuit board 1310, the stepped portion 1311 having the second height H2, which is recessed by the third height H3 is formed between the first peripheral portion 1310a and the second peripheral portion 1310b.

Figure 18:
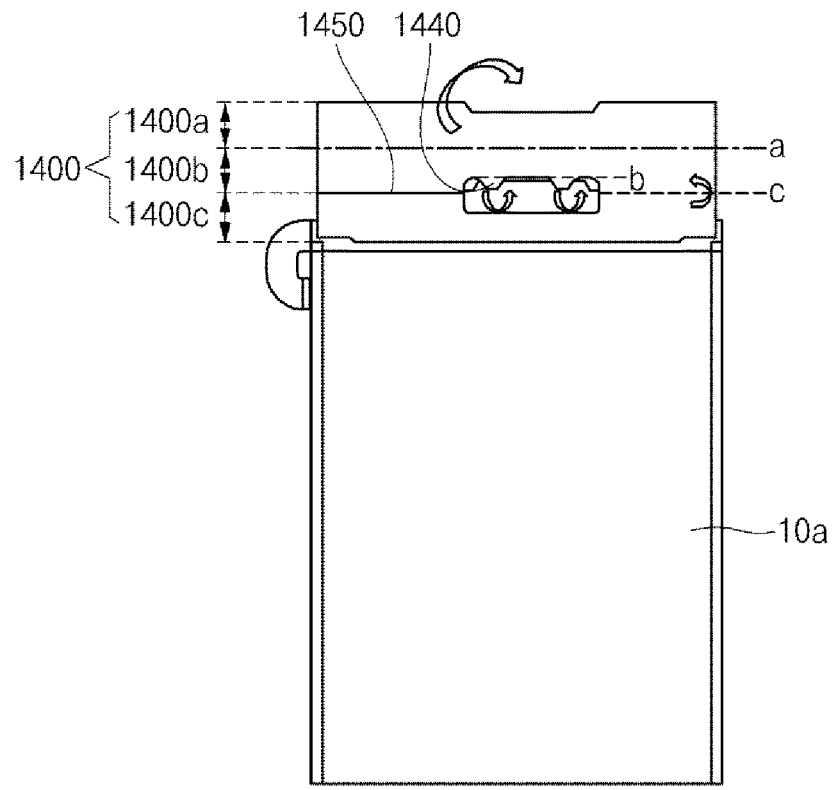
Figure 19:
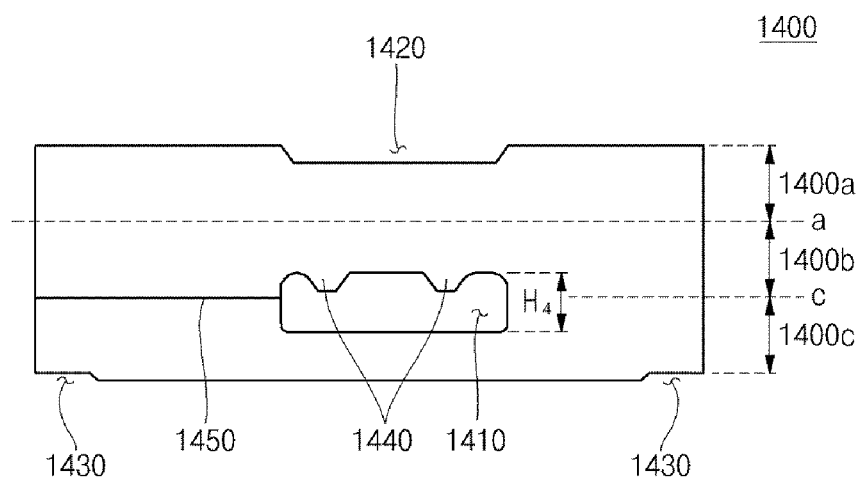
Figure 20:
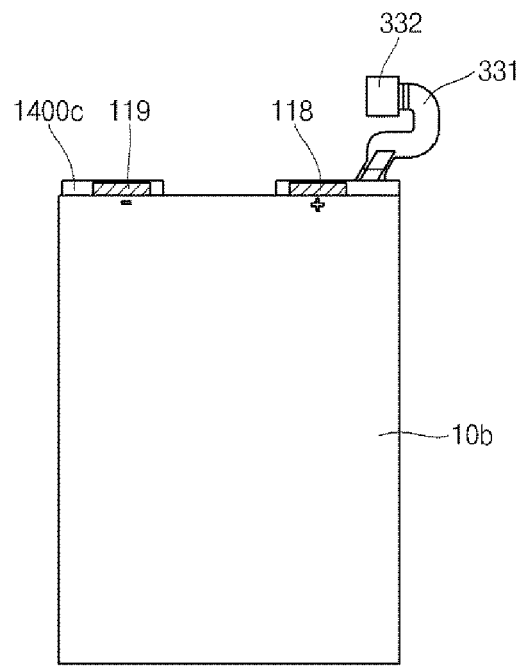
Figure 21:
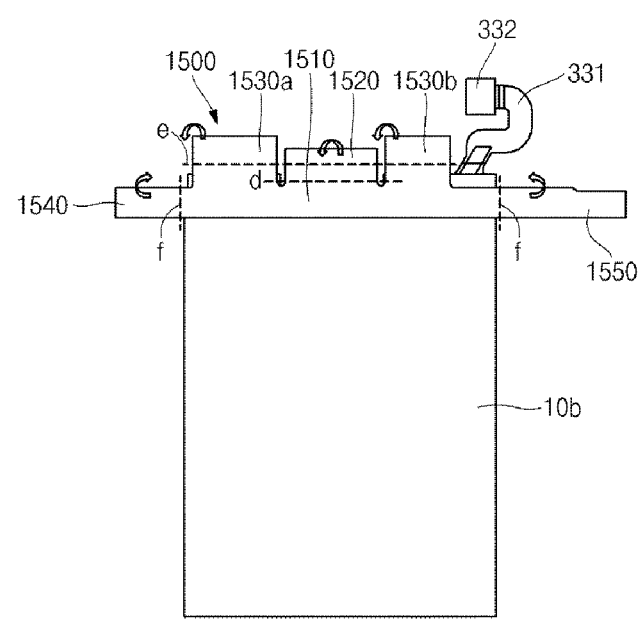
Figure 22:
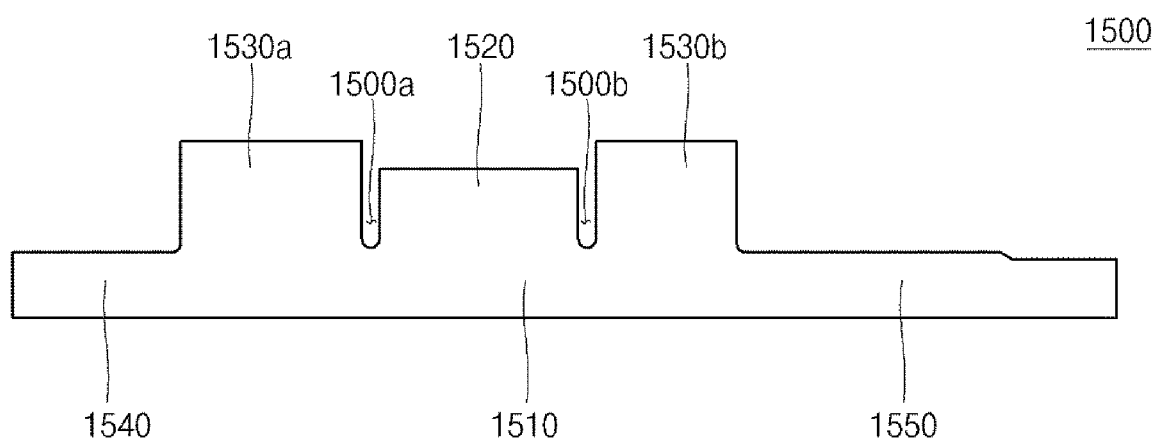
Figure 23:
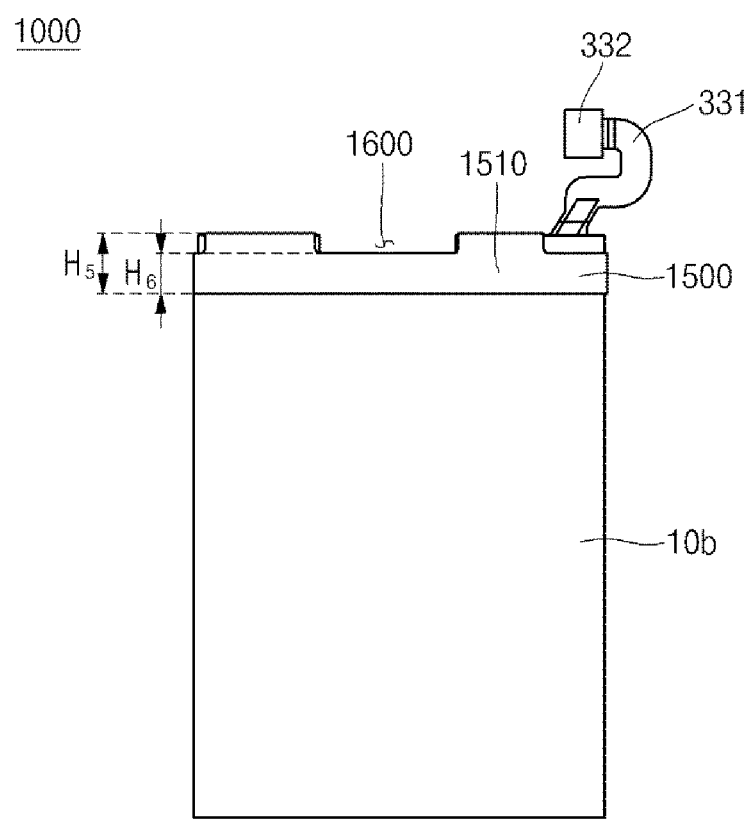

Referring to FIGS. 18 and 19, a first insulating member 1400 is disposed on connecting portions of the bare cell 10 and the PCM 1300.

Here, the first insulating member 1400 is preferably formed of an insulating tape having an adhesive material coated on surfaces corresponding to the bare cell 10 and the PCM 1300 for the purpose of facilitating the process.

The first insulating member 1400 includes a first region 1400a, a second region 1400b and a third region 1400c.

First, the second region 1400b is attached to cover one surface of the protection circuit board 1310 and has a first bending line a formed on its top surface and a third bending line c formed on its bottom surface.

The third region 1400c is formed under the third bending line c of the second region 1400b and is attached to cover a terrace portion 203.

A first groove 1410 located to correspond to the stepped portion 1311 is formed at a boundary portion between the second region 1400b and the third region 1400c. Since the first groove 1410 is bent about the third bending line c, it has a height H4, which is approximately two times larger than the height H3 of the stepped portion 311, to make its shape after being bent correspond to the shape of the stepped portion 1311.

While the first groove 410 of the first insulating member 400 shown in FIG. 6 is exposed to one end, the first groove 1410 of the first insulating member 1400 in the battery pack according to another embodiment of the present invention is formed at the roughly central region of the first insulating member 1400 according to the shape of the stepped portion 1311 formed at the roughly central region of the protection circuit board 1310. Accordingly, a cutting line 1450 extending to one end or the other end of the first groove 1410 is preferably formed at a boundary portion between the second region 1400b and the third region 1400c in view of attachment and bending of the first insulating member 1400.

In addition, the second region 1400b includes at least one protrusion 1440 extending from the first groove 1410 to the third region 1400*c*. The at least one protrusion 1440 is bent in a first direction in view of the second bending line b on the stepped portion 1311 and is attached to cover the other surface of the protection circuit board 1310 (which is to turn into a front surface later when the protection circuit board 1310 is overturned).

The first region 1400*a* is a region formed on the first bending line a of the second region 1400*b* and has a second groove 1420 shaped and located to correspond to the stepped portion 1311.

In order to minimize interference between the third region 1400*c* and a side surface bending line of the pouch 10 formed on the terrace portion 203, a third groove 1430 is preferably formed opposite corners of a bottom side of the third region 1400*c*.

The first region 1400*a* of the first insulating member 1400 is bent in a second direction opposite to the first direction in view of the first bending line a and is attached to cover the other surface of the protection circuit board 1310.

In addition, the second region 1400*b* of the first insulating member 1400 is bent in the first direction in view of the third bending line c to then be disposed on the third region 1400*c*. Accordingly, the second region 1400*b* and the third region 1400*c* are sequentially interposed between the protection circuit board 1310 and the terrace portion 203.

Next, referring to FIGS. 20 to 23, a second insulating member 1500 is disposed on the rear surface 10*b* of the bare cell 10.

Here, the second insulating member 1500 is preferably formed of an insulating tape having an adhesive material coated on a surface corresponding to the rear surface 10*b* of the bare cell 10 for the purpose of facilitating the process.

The second insulating member 1500 includes a body portion 1510 and a plurality of extending portions 1520, 1530*a*, 1530*b*, 1540 and 1550 extending from the body portion 1510.

The body portion 510 is attached to cover the rear surface 10*b* of the bare cell 10 and includes a fourth bending line d and a fifth bending line e formed on its top surface and a sixth bending line f formed on its left and right sides.

The extending portions 1520, 1530*a*, 1530*b*, 1540 and 1550 include a first extending portion 1520, second extending portions 1530*a* and 1530*b*, a third extending portion 1540 and a fourth extending portion 1550.

The first extending portion 1520 is formed at a location corresponding to the stepped portion 1311 and is downwardly bent from the fourth bending line d to cover the first region 1400*a* of the first insulating member 1400.

The second extending portions 1530*a* and 1530*b* are formed at locations corresponding to the peripheral portions 1310*a* and 1310*b* and is downwardly bent from the fifth bending line e to cover the first region 1400*a* of the first insulating member 1400.

Here, separating grooves 1500*a* and 1500*b* are formed between the first extending portion 1520 and each of the second extending portions 1530*a* and 1530*b* to separate the first extending portion 1520 and the second extending portions 1530*a* and 1530*b* from each other.

The third extending portion 1540 and the fifth extending portion 1540 extend from the body portion 1510 in left and right sides and are bent from the sixth bending line f in left and right sides, respectively, to cover the first region 1400*a* of the first insulating member 1400 on the terrace portion 203.

In the illustrated embodiment, the first bending line a to the sixth bending line f are single lines, which is, however, only for convenience sake of explanation. In view of mechanism of connection with other components, each of the first to sixth bending lines a to f may be formed to have a predetermined width.

That is to say, the PCM 1300 surrounded by the first insulating member 1400 and the second insulating member 1500 has a fifth height H5 at its region corresponding to the peripheral portions 1310*a* and 1310*b* and a sixth height H6 at its region corresponding to the recessed portion 1310*b*. That is to say, the completed battery pack 1000 has a stepped portion 1600 having the sixth height H6, thereby providing a space for mounting an external element or an external device.

Next, a battery pack according to still another embodiment of the present invention and a manufacturing method thereof will be described with reference to FIGS. 24 to 28.

FIGS. 24 to 28 are partially cross-sectional views sequentially illustrating a manufacturing method of a battery pack according to still another embodiment of the present invention.

Referring to FIGS. 24 to 28, a protective circuit module (PCM) is disposed to be electrically connected to a positive lead tab and a negative lead tab protruding to a top end of a bare cell and a first insulating member 2400 is disposed on connecting portions of the bare cell and the PCM.

Figure 24:
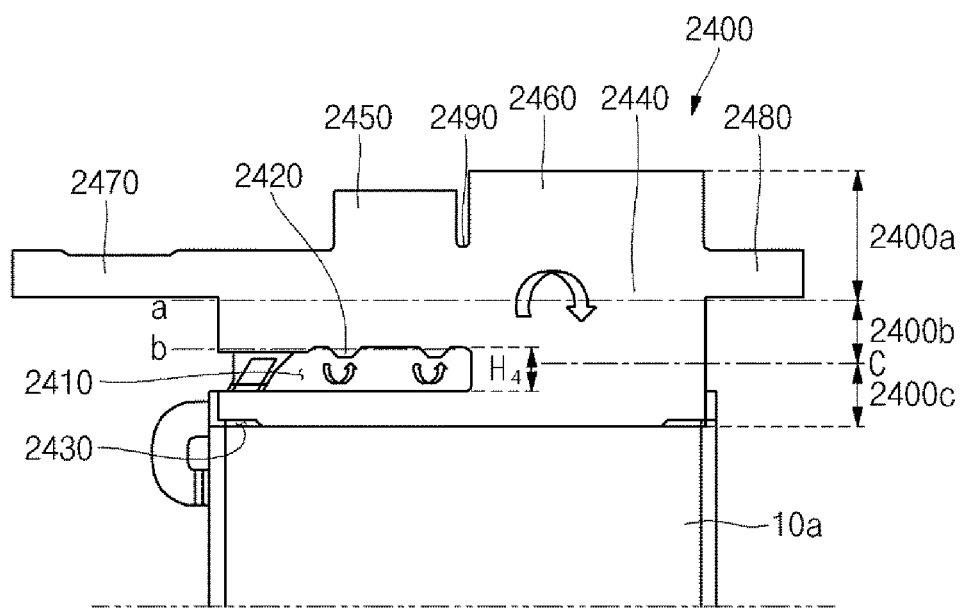
FIGS. 24 to 28 are partially cross-sectional views sequentially illustrating a manufacturing method of a battery pack according to still another embodiment of the present invention.
Figure 25:
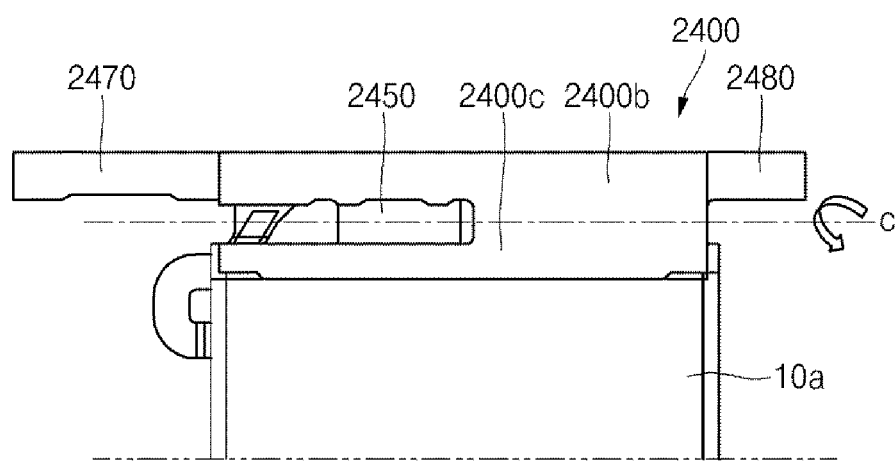
Figure 26:
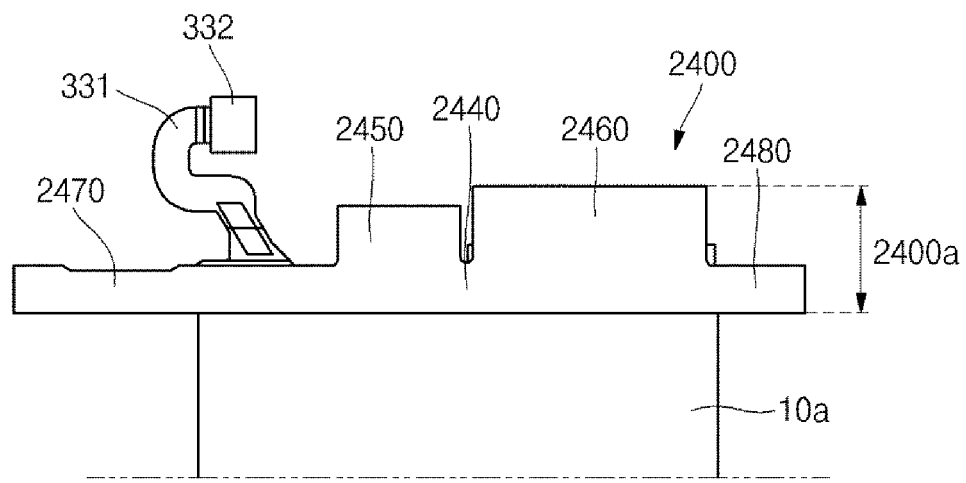
Figure 27:
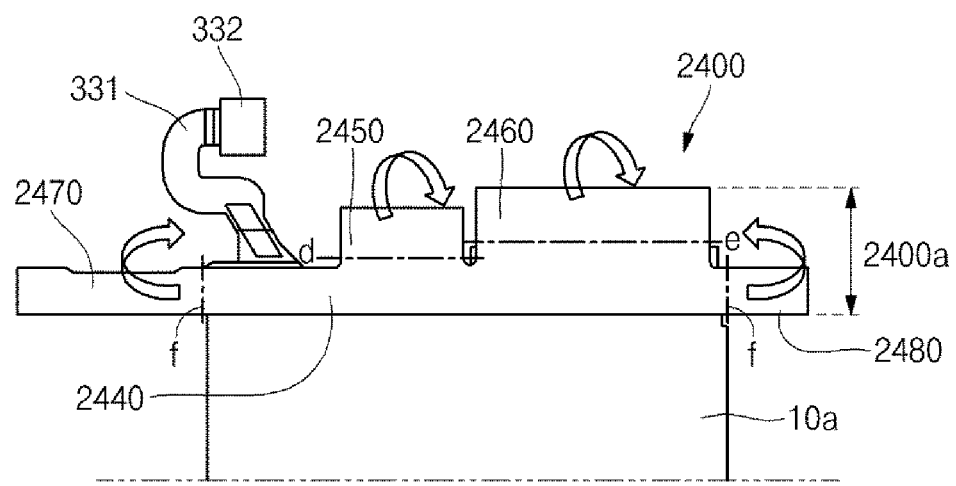
Figure 28:
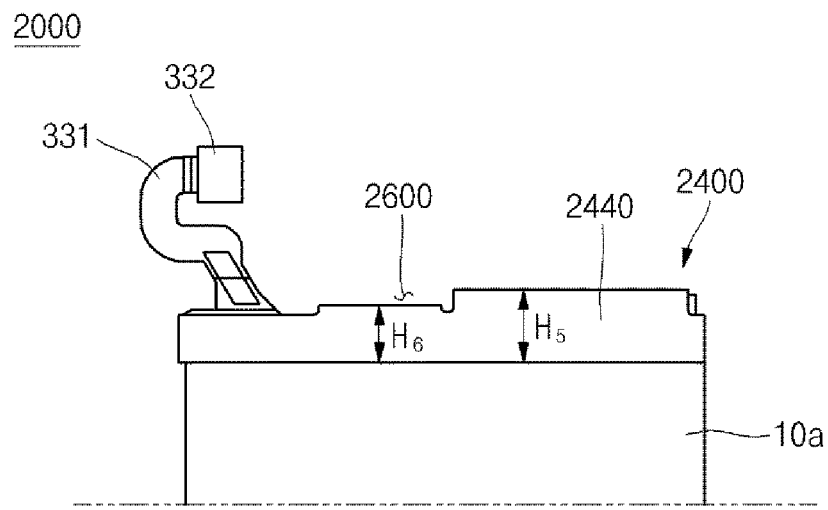

In FIG. 24, the same functional components as those shown in FIG. 7 will be denoted by the same reference numerals, and detailed descriptions thereof will be omitted.

Here, the first insulating member 2400 is preferably formed of an insulating tape having an adhesive material coated on surfaces corresponding to the bare cell and the PCM for the purpose of facilitating the process.

The first insulating member 2400 includes a first region 2400*a*, a second region 2400*b* and a third region 2400*c*.

First, the second region 2400*b* is attached to cover one surface of the protection circuit board and has a first bending line a formed on its top surface and a third bending line c formed on its bottom surface.

The third region 2400*c* is formed under the third bending line c of the second region 2400*b* and is attached to cover a terrace portion 203.

A first groove 2410 located to correspond to a stepped portion is formed at a boundary portion between the second region 2400*b* and the third region 2400*c*. Since the first groove 2410 is bent about the third bending line c, it has a height H4, which is approximately two times larger than the height H3 of the stepped portion, to make its shape after being bent correspond to the shape of the stepped portion.

In addition, the second region 2400*b* includes at least one protrusion 2420 extending from the first groove 2410 to the third region 2400*c*. The at least one protrusion 2420 is bent in a first direction in view of the second bending line b on the stepped portion and is attached to cover the other surface of the protection circuit board (which is to turn into a front surface later when the protection circuit board is overturned).

In order to minimize interference between the third region 2400*c* and a side surface bending line of the pouch formed on the terrace portion, a third groove 2430 is preferably formed opposite corners of a bottom side of the third region 2400*c*.

The first region 2400*a* is a region formed on the first bending line a of the second region 2400*b* and includes a body portion 2440 and a plurality of extending portions 2450, 2640, 2470 and 2480 extending from the body portion 2440.

The body portion 2440 is bent in a second direction opposite to the first direction in view of the first bending line a. The body portion 2440 is attached to cover the other surface of the protection circuit board and includes a fourth bending line d and a fifth bending line e formed on its top surface and a sixth bending line f formed on its left and right sides.

The extending portions 2450, 2640, 2470 and 2480 include a first extending portion 2450, a second extending portion 2460, a third extending portion 2470 and a fourth extending portion 2480.

The first extending portion 2450 is formed at a location corresponding to the stepped portion and is downwardly bent from the fourth bending line d to cover the rear surface of the bare cell.

The second extending portion 2460 is formed at a location corresponding to the peripheral portion and is downwardly bent from the fifth bending line e to cover the rear surface of the bare cell.

Here, a separating groove 2490 is formed between the first extending portion 2450 and the second extending portion 2460 to separate the first extending portion 2450 and the second extending portion 2460 from each other.

The third extending portion 2470 and the fourth extending portion 2480 extend from the body portion 2440 in left and right sides and are bent from the sixth bending line f in left and right sides, respectively, to cover the rear surface of the bare cell.

In the illustrated embodiment, the first bending line a to the sixth bending line f are single lines, which is, however, only for convenience sake of explanation. In view of mechanism of connection with other components, each of the first to sixth bending lines a to f may be formed to have a predetermined width.

That is to say, the PCM surrounded by the first insulating member 2400 has a fifth height H5 at its region corresponding to the peripheral portion and a sixth height H6 at its region corresponding to the recessed portion. That is to say, the completed battery pack 2000 has a stepped portion 2600 having the sixth height H6, thereby providing a space for mounting an external element or an external device.

Hereinafter, for a better understanding of the present invention, the battery packs according to embodiments of the present invention will be described with reference to FIGS. 29 and 30.

Figure 29:
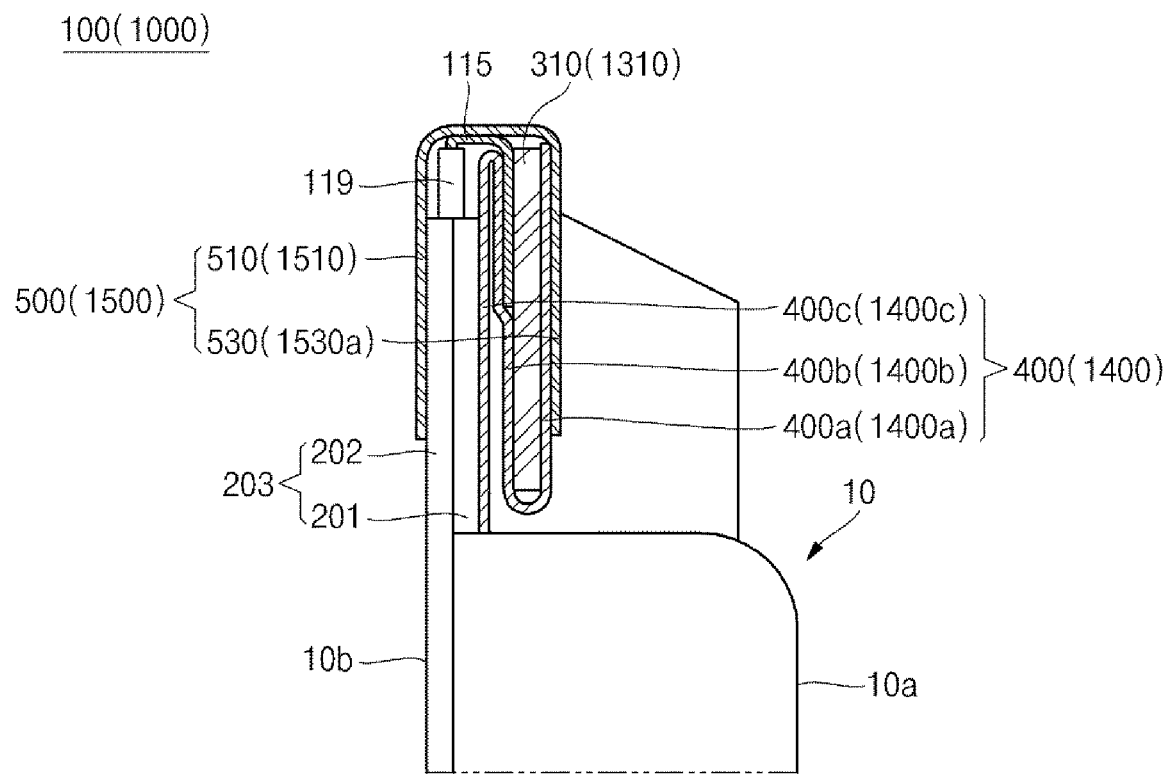
FIG. 29 is a cross-sectional view of a battery pack according to an embodiment of the present invention.
Figure 30:
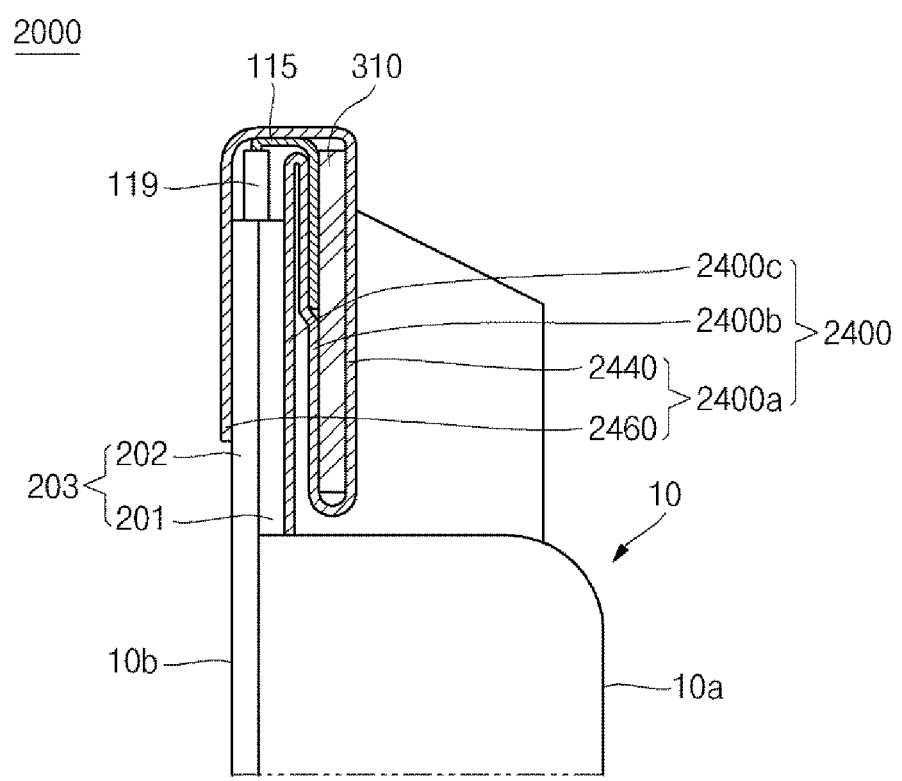
FIG. 30 is a cross-sectional view of a battery pack according to another embodiment of the present invention.

FIG. 29 is a cross-sectional view of a battery pack according to an embodiment of the present invention and FIG. 30 is a cross-sectional view of a battery pack according to still another embodiment of the present invention.

First, the battery pack 100 (1000) according to the embodiment of the present invention will be described with reference to FIG. 29. In the battery pack 100 (1000), portions of edges of the first and second outer case members 201 and 202 of the pouch 12 are thermally fused to form the terrace portion 203.

In addition, the negative lead tab 115 of the electrode assembly drawn out through the terrace portion 203 is surrounded by the insulating member 119 and is then bent to be adhered to the protection circuit board 310 (1310).

Here, the protection circuit board 310 (1310) shown in FIG. 29 corresponds to a section of the peripheral portion.

As described above, the first insulating member 400 (1400) includes the first region 400a (1400a), the second region 400b (1400b) and the third region 400c (1400c).

Here, the first region 400a (1400a) is attached to the front surface of the protection circuit board 310 (1310). The second region 400b (1400b) is bent from a bottom end of the first region 400a (1400a) to then upwardly extend and is attached to cover the rear surface of the protection circuit board 310 (1310). In addition, the third region 400c (1400c) is bent from a top end of the second region 400b (1400b) to then downwardly extend and is attached to cover the terrace portion 203.

In addition, the second insulating member 500 (1500) is attached to surround the rear surface 10b of the bare cell 10 and the first region 400a (1400a) of the first insulating member 400 (1400) on the front surface of the protection circuit board 310 (1310).

As described above, the second insulating member 500 (1500) includes the body portion 510 (1510) and the second extending portion 530 (1530a) extending from the body portion 510 (1510).

Here, the body portion 510 (1510) is attached to cover the rear surface 10b of the bare cell 10. That is to say, the body portion 510 (1510) is attached to the outer surface of the second outer case member 202. In addition, the second extending portion 530 (1530a) is bent from the top end of the body portion 510 (1510) to then downwardly extend and is attached to cover the first region 400a (1400a) of the first insulating member 400 (1400). Here, bent regions of the body portion 510 (1510) and the second extending portion 530 (1530a) may protect the negative lead tab 115 exposed to the outside from external circumstances.

Next, the battery pack 2000 according to still another embodiment of the present invention will be described with reference to FIG. 30. In the battery pack 2000 according to still another embodiment of the present invention, portions of edges of the first and second outer case members 201 and 202 of the pouch 12 are thermally fused to form the terrace portion 203.

In addition, the negative lead tab 115 of the electrode assembly drawn out through the terrace portion 203 is surrounded by the insulating member 119 and is then bent to be adhered to the protection circuit board 310.

Here, the protection circuit board 310 shown in FIG. 30 corresponds to a section of the peripheral portion.

In addition, the first insulating member 2400 is attached to surround the terrace portion 203 and the protection circuit board 310.

As described above, the first insulating member 2400 includes the first region 2400a, the second region 2400b and the third region 2400c.

Here, the first region 2400a is attached to cover the front surface of the protection circuit board 310 and the rear surface 10b of the bare cell 10.

The first region 2400a includes the body portion 2440 and the second extending portion 2460 extending from the body portion 2440.

The body portion 2440 is attached to cover the front surface of the protection circuit board 310. In addition, the second extending portion 2460 is bent from the top end of the body portion 2440 to then downwardly extend and is attached to cover the rear surface 10b of the bare cell 10. That is to say, the second extending portion 2460 is attached to the outer surface of the second outer case member 202. Here, bent regions of the body portion 2440 and the second extending portion 2460 may protect the negative lead tab 115 exposed to the outside from external circumstances.

The second region 2400b is bent from the bottom end of the first region 2400a body portion 2440 to then upwardly extend and is attached to cover the rear surface of the protection circuit board 310. In addition, third region 2400c is bent from the top end of the second region 2400b to then downwardly extend and is attached to cover the terrace portion 203.

While the battery pack of the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery pack comprising:
    a bare cell having a positive lead tab and a negative lead tab;
    a protection circuit module (PCM) electrically connected to the positive lead tab and the negative lead tab and having a stepped portion and a peripheral portion, wherein the stepped portion is recessed has a smaller height than the peripheral portion, and wherein at least one of the lead tabs is arranged to engage with the peripheral portion; and
    a first insulating member having a groove formed to correspond to the stepped portion, the first insulating member surrounding at least a portion of the bare cell and the PCM, wherein at least a portion of the groove is folded in a longitudinal direction thereof.

2. The battery pack of claim 1, wherein the PCM comprises:
    a protection circuit board connected to the positive lead tab and the negative lead tab and having a long side and a short side;
    at least one protection circuit device mounted on the protection circuit board; and
    a connector outwardly extending from the protection circuit board,
    wherein the stepped portion is formed on the long side of the protection circuit board.

3. The battery pack of claim 2, wherein a terrace portion is formed at an end of the bare cell and surrounds portions of the positive lead tab and the negative lead tab, and the protection circuit board is mounted on the terrace portion.

4. The battery pack of claim 3, wherein the first insulating member comprises:
    a first region covering a front surface of the protection circuit board;
    a second region bent from an end of the first region and extending to one side and covering a rear surface of the protection circuit board; and
    a third region bent from an end of the second region and extending to the other side and covering the terrace portion,
    wherein the second region and the third region are sequentially disposed between the protection circuit board and the terrace portion.

5. The battery pack of claim 4, wherein the groove corresponding to the stepped portion is formed through the second region and the third region of the first insulating member.

6. The battery pack of claim 5, wherein the second region of the first insulating member includes at least one protrusion extending from the first groove, and the protrusion is bent on the stepped portion to cover a front surface of the PCM.

7. The battery pack of claim 4, wherein another groove corresponding to the stepped portion is formed at one side of the first region.

8. The battery pack of claim 4, further comprising a second insulating member that surrounds a rear surface of the bare cell and the first region of the first insulating member on the protection circuit board.

9. The battery pack of claim 8, wherein the second insulating member includes:
    a body portion covering the rear surface of the bare cell;
    a first extending portion extending from the body portion to the stepped portion and bent to the other side to cover the first region of the first insulating member;
    a second extending portion extending from the body portion to the peripheral portion and bent to the other side to cover the first region of the first insulating member;
    a third extending portion extending from the body portion to a right side and bent to cover the first region of the first insulating member; and
    a fourth extending portion extending from the body portion to a left side and bent to cover the first region of the first insulating member.

10. The battery pack of claim 4, wherein the first region of the first insulating member further includes an extending portion bent to cover a rear surface of the bare cell.

11. The battery pack of claim 10, wherein the extending portion includes:
    a first extending portion bent from the stepped portion to the other side;
    a second extending portion bent from the peripheral portion to the other side;
    a third extending portion bent from a right side of the PCM; and
    a fourth extending portion bent from a left side of the PCM.

12. The battery pack of claim 4, wherein the stepped portion is formed to be adjacent to the short side of the protection circuit board.

13. The battery pack of claim 4, wherein the stepped portion is formed at a central region of the long side of the protection circuit board.

14. The battery pack of claim 13, wherein the first insulating member includes cutting lines formed at bending lines of the second region and the third region, and the cutting lines are formed to extend from the groove to the left side or the right side.

15. The battery pack of claim 1, wherein the first insulating member is folded multiple times in opposite directions to cover the portion of the PCM.

16. A battery pack comprising:
    a bare cell having a positive lead and a negative lead;
    a protection circuit module (PCM) having a protection circuit board connected to the positive and negative leads, wherein the PCM has a stepped portion and a peripheral portion where the stepped portion is recessed from the peripheral portion, and wherein at least one of the lead tabs is arranged to engage with the peripheral portion;
    a first insulating member positioned on a first side of the bare cell so as to cover the PCM that is contoured to match the stepped portion of the PCM, the first insulating member having a groove formed to correspond to the stepped portion, wherein at least a portion of the groove is folded in a longitudinal direction thereof.

17. The battery pack of claim 16, wherein the first insulating member comprises:
    a first region covering a front surface of the protection circuit board;
    a second region bent from an end of the first region and extending to one side and covering a rear surface of the protection circuit board; and a third region bent from an end of the second region and extending to the other side and covering a terrace portion, wherein the second region and the third region are sequentially disposed between the protection circuit board and the terrace portion.

18. The battery pack of claim 17, wherein the groove is formed through the second region and the third region of the first insulating member.

19. The battery pack of claim 18, wherein the second region of the first insulating member includes at least one protrusion extending from the groove, and the protrusion is bent on the stepped portion to cover the front surface of the PCM.

20. The battery pack of claim 16, further comprising a second insulating member positioned on a second side of the bare cell so as to cover the PCM.

21. The battery pack of claim 20, wherein the second insulating member includes:
   a body portion covering a front surface of the bare cell;
   a first extending portion extending from the body portion to the stepped portion and bent to the other side to cover a first region of the first insulating member;
   a second extending portion extending from the body portion to the peripheral portion and bent to the other side to cover the first region of the first insulating member;
   a third extending portion extending from the body portion to a right side and bent to cover the first region of the first insulating member; and
   a fourth extending portion extending from the body portion to a left side and bent to cover the first region of the first insulating member.

* * * * *